US008903134B2

(12) United States Patent
Abileah (10) Patent No.: US 8,903,134 B2
(45) Date of Patent: Dec. 2, 2014

(54) METHODS FOR MAPPING DEPTH AND SURFACE CURRENT

(76) Inventor: Ron Abileah, San Carlos, CA (US)

(*) Notice: Subject to any disclaimer, the term of this patent is extended or adjusted under 35 U.S.C. 154(b) by 207 days.

(21) Appl. No.: 13/091,345

(22) Filed: Apr. 21, 2011

(65) Prior Publication Data

US 2012/0020527 A1 Jan. 26, 2012

Related U.S. Application Data

(60) Provisional application No. 61/400,037, filed on Jul. 21, 2010.

(51) Int. Cl.
*G06K 9/00* (2006.01)

(52) U.S. Cl.
CPC .................. *G06K 9/0063* (2013.01)
USPC .......................... 382/106; 382/103

(58) Field of Classification Search
USPC .......................... 382/106, 107–109
See application file for complete search history.

(56) References Cited

U.S. PATENT DOCUMENTS

| 7,379,614 | B2 * | 5/2008 | Cho et al. | 382/255 |
|---|---|---|---|---|
| 2007/0188516 | A1 * | 8/2007 | Ioup et al. | 345/606 |
| 2007/0242884 | A1 | 10/2007 | Dugan | |
| 2010/0315284 | A1 * | 12/2010 | Trizna | 342/123 |

OTHER PUBLICATIONS

Fieguth—"Mapping and Pseudoinverse Algorithms for Ocean Data Assimilation", IEEE 2003, pp. 43-51.*
Seppke—"A Knowledge Based Framework for the Detection of Measurement Uncertainties in Derived Sea Surface Current Fields", IEEE Jul. 25-30, 2010, pp. 2255-2258.*
Brailean—"Recursive Map Displacement Field Estimation and Its Apblhcatibns"; IEEE, 1996, pp. 917-920.*
R. Abileah, "Mapping Shallow Water Depth from Satellite," Proceedings of the ASPRS 2006, Reno, Nevada May 1-5, 2006.
R. Abileah, "Shallow-Water Bathymetry with Commercial Satellite," Sea Technology, Jun. 2006.
R. Abileah, "Mapping Ocean Currents With IKONOS," Proceedings of IEEE Oceans 2007—Europe, Aberdeen, Scotland, Jun. 2007.
R. Abileah and D. Trizna, "Shallow Water Bathymetry with an Incoherent X-Band Radar Using Small (Smaller) Space-Time Image Cubes," Proceedings of the IGARSS'10, Honolulu, Hawaii, Jul. 2010.

(Continued)

*Primary Examiner* — Matthew Bella
*Assistant Examiner* — Weiwen Yang
(74) *Attorney, Agent, or Firm* — Moore Patents; David Dreyfuss; Cynthia R. Moore (57) ABSTRACT

Systems and methods for acquiring accurate maps of nearshore depth and surface currents are disclosed. An imaging platform is provided which is able to obtain a time series of overhead images of an area of a body of water having pixel intensity correlated with wave height. The platform may be on a tower, or may be airborne, space-borne, or ship-borne. The imaging modality may be optical, radar, or LIDAR. Image processing corrects the images, as and if needed, such they are mapped onto a grid of fixed coordinates, and the pixel intensities have a near linear relationship to wave height. A two-dimensional Fourier transform of each image is obtained, then the extremum of an objective function is found, wherein the objective function is a function of the depth and surface current (velocity) vector at each pixel location, and the extremum is sharply peaked at a particular set of depth and a particular set of surface current vector values. A pixel-by-pixel map of depths and or currents can be produced.

20 Claims, 5 Drawing Sheets

(56) References Cited

OTHER PUBLICATIONS

P. S. Bell, "Shallow water bathymetry derived from an analysis of X-band radar images of waves," Coastal Engineering, 37(3-4), 513-27, 1999.

P.S. Bell, "Determination of bathymetry using marine radar images of waves," Proceedings of the Fourth International Symposium on Ocean Wave Measurement and Analysis, Sep. 2-6, 2001, San Francisco, California.

P.S. Bell, J.J. Williams, S. Clark, B.D. Morris, and A. Vila-Concejo, "Nested radar systems for remote coastal observations," Journal of Coastal Research, SI 39 (Proceedings of the ICS 2004), 483-487, 2004.

J. W. Caruthers, R. A. Arnone, W. Howard, C. Haney, and D.L. Durham, "Water depth determination using wave refraction analysis of aerial photography," Report 110, Naval Ocean Research and Development Activity, 1985.

H. Dankert, "Retrieval of Surface-Current Fields and Bathymetries using Radar-Image Sequences," Proceedings of the International Geoscience and Remote Sensing Symposium, Toulouse, France, 2003.

J. P. Dugan, H. H. Suzukawa, C.P. Forsyth, and M. S. Farber, "Ocean Wave Dispersion Surface Measured with Airborne IR Imaging System," IEEE Transactions on Geoscience and Remote Sensing, 34, 1282-84, Sep. 1996.

J.P. Dugan, G.J. Fetzer, J. Bowden, G.J. Farruggia, J.Z. Williams, C.C. Piotrowski, K. Vierra, D. Campion, and D.N. Sitter, "Airborne Optical System for Remote Sensing of Ocean Waves," J. Atmospheric and Oceanic Technology, 2000.

J. Dugan and C. Piotrowski, "Developmental System for Maritime Rapid Environmental Assessment Using UAVs," Proceedings of the Oceanology International 2000 (Mar. 7-10, 2000).

J.P. Dugan, C. C. Piotrowski, and J.Z. Williams, "Water depth and surface current retrievals from airborne optical measurements of surface gravity wave dispersion," J. Geophysical Research, 106, 16903-15, 2001.

S. Flampouris, "Investigation of Correlations between Radar Deduced Bathymetries Due to the Outer Impact of a Storm in the Area 'Salzand'," internal GKSS report No. 2006/16, 2006.

S. Flampouris, J. Seemann, and F. Ziemer, "Sharing our Experience using Wave Theories Inversion for the Determination of the Local Depth," Proceedings of the IEEE Oceans 2009—Europe, May 11-14, 2009.

T. S. Hedges, "An empirical modification to linear wave theory," Proceedings of the Institution of Civil Engineers, 61, 575-79, 1976.

K. Hessner, K. Reichert, and W. Rosenthal, "Mapping of sea bottom topography in shallow seas by using a nautical radar," Proceedings of the 2nd Symposium on Operationalization of Remote Sensing, ITC, Enschede, Netherlands, Aug. 16-20, 1999.

P. Hoogeboom, J.C.M. Kleijweg, and D. van Halsema, "Seawave measurements using ship's radar," Proceedings of the IGARSS'86, Sep. 8-11, 1986.

A.B. Kennedy, R.A. Dalrymple, and J.T. Kirby, "Determination of Inverse Depths Using Direct Boussinesq Modeling," J. Waterway, Port, Coastal, and Ocean Engineering, Jul./Aug. 2000.

J.C. Nieto-Borge and C. Guedes Soares, "Analysis of directional wavefields using X-band navigation radar," Coastal Engineering 40, 375-91, 2000.

C.C. Piotrowski, and J.P. Dugan, "Accuracy of Bathymetry and Current Retrievals From Airborne Optical Time-Series Imaging of Shoaling Waves," IEEE Transactions on Geoscience and Remote Sensing, 40, No. 12, Dec. 2002.

C. M. Senet, J. Seemann, S. Flampouris, and F. Ziemer, "Determination of Bathymetric and Current Maps by the Method DiSC Based on the Analysis of Nautical X-Band Radar Image Sequences of the Sea Surface," IEEE Transactions on Geoscience and Remote Sensing, 46, Aug. 1-9, 2008.

M.J. Smith, E.M. Poulter, J.A. McGregor, and B.R. Stanton, "Microwave Radar Investigation of Coastal Ocean Wave Propagation," Proceedings of the IGARSS'91, Jun. 3-6, 1991.

H.F. Stockdon and R.A. Holman, "Estimation of wave phase speed and nearshore bathymetry from video imagery," J. Geophysical Research 105 (C9), 22015-33, 2000.

S. Takewaka, "Measurements of Surfzone Dynamics and Bottom Profiles with Moored Video System," PACON Conference, Hawaii, 2000.

Y. Tang, Y Hao, and Z. Lu, "Ocean Surface Currents Determination from X-Band Radar Image Sequences," Proceedings of the 2008 International Workshop on Education Technology and Training & 2008 International Workshop on Geoscience and Remote Sensing, 1, 320-23, 2008.

D. Trizna, "Errors in Bathymetric Retrievals Using Linear Dispersion in 3-D FFT Analysis of Marine Radar Ocean Wave Imagery," IEEE Transactions on Geoscience and Remote Sensing, 39, No. 11, Nov. 2001.

D. W. Wang, J. M. Kaihatu, and P.A. Hwang, "On the analysis of dispersion relation of shoaling waves," Proceedings of the 7th International Workshop on Wave Hindcasting and Forecasting, Banff, Alberta, 353-60, Oct. 2002.

J. M. Weiss, "Three-Dimensional Linear Solution for Wave Propagation with Sloping Bottom," IEEE Journal of Oceanic Engineering, 22, 203-10, Apr. 1997.

International Search Report for PCT/US2011/039487, Nov. 23, 2011.

International Preliminary Report on Patentability for PCT/US2011/039487, issued Jan. 22, 2013.

\* cited by examiner

METHODS FOR MAPPING DEPTH AND SURFACE CURRENT

CROSS-REFERENCE TO RELATED APPLICATIONS

This application claims priority from U.S. Provisional Patent Application No. 61/400,037, filed Jul. 21, 2010, which is incorporated herein by reference.

FIELD OF THE INVENTION

One or more embodiments of the present invention relate to bathymetry and the measurement of surface currents using images of surface waves.

BACKGROUND

Two technologies are widely used and accepted as reliable methods for performing bathymetric surveys. These technologies are considered the gold standards of bathymetric surveying. One technology is ship-based side-scan sonar, and the other is airborne bathymetric LIDAR (light detection and ranging). Both meet the industry IHO 1 standard in depth accuracy and resolution. They are however expensive and time consuming. There is a need for less costly surveys with more rapid turnaround.

Two cost-saving alternative bathymetry surveys technologies have received the most attention and development efforts. The first is photogrammetric bathymetry, basing the depth on the relationship to the radiance of the ocean bottom. The main problem with the photogrammetric method is the need to know the optical properties of the water and ocean bottom. Usually these are not well known and can be variable over a small area. The second alternative technology is "wave-kinematics bathymetry" (WKB), for which systems and algorithms are discussed here. However, despite decades of research and development, neither technology has achieved much acceptance and commercial success.

WKB systems and algorithms use the relationship between the velocity of gravity waves and depth. In the simplest terms, the speed of ocean waves decreases as waves propagate into shallow depth and "feel" the bottom. More precisely, the frequency-wavenumber ($\omega$,k) spectrum transforms according to the well known linear gravity wave dispersion formula, $$\omega_0(\vec{k}|d,\vec{u}) = \sqrt{g|k|\tanh(|k|d)} - \vec{k}\cdot\vec{u},$$

where d is the ocean depth and $\vec{u}$ is the surface current vector. This equation is the gravity wave dispersion approximation for wave heights, H, that are small relative to the depth. While the linear gravity wave approximation is the one most often used, alternative approximations have been proposed for moderate wave heights, H→d. An example is the empirical approximation [Hedges, 1976]:

$$\omega_0(\vec{k}|d,\vec{u}) = \sqrt{g|k|\tanh(|k|d(1+\alpha H/d))} - \vec{k}\cdot\vec{u},$$

where $\alpha$ is an empirically derived constant in the range of 0.4-0.5 [Flampouris et al., 2009] and H is the wave height (either known or guessed-typically ~1 m). It can be readily seen that this is the linear gravity wave dispersion with a bias correction. Note that WKB algorithms are useful primarily for d>H. The region where d≤H defines the surf zone where waves break and become bore waves. This region is typically excluded from bathymetry data. As such, the non-linearities that occur as H→d are of little practical significance to real-world bathymetry and are included herein only for completeness.

Several WKB sensor systems have been implemented over the past 25 years. They are mostly experimental, but a handful offer bathymetry surveying as a commercial service. Various imaging systems can be used.[1] In all such systems, a sequence of images is recorded to observe the wave motion over a dwell time, T. The image data is thus referred to as an image cube comprised of three dimensions, two spatial dimensions and time.

[1] The purest image data for bathymetry would be images where the pixel intensities are linearly proportional to the ocean surface heights. Most sensor systems do not actually image surface height. The most common sensors used in this method are visible light cameras and microwave radars. Cameras image the ocean waves by reflection of sun and sky light; microwave radars image waves through Bragg scattering from wind generated capillary waves. Other sensor modalities exist for imaging waves. Some examples: thermal IR, as reported in [Farber, 1995] and [Dugan, 1996], and topographic LIDAR [Wang, 2002]. The topographic LIDAR (not to be confused with bathymetric LIDAR) is the only sensor providing direct measure of the surface height. All the others do not but under appropriate conditions can be reasonable approximations of height sensing.

Two types of algorithms used to process the image cubes into bathymetry have been previously described:

3D Fourier Analysis: The image data is partitioned into "tile-cubes" of XY in space, and T in time. The cubes are transformed from three-dimensional space-time data into three-dimensional wavenumber-frequency spectra. These algorithms are the most common and most practiced in the literature. This technique was first mentioned in [Hoogeboom, 1986] and refined in many subsequent works, e.g., [Dugan et al., 2000]. 3D Fourier Analysis uses very large image cubes.

2D Fourier Analysis: The "tile-cubes" are Fourier transformed into two-dimensional wavenumber spectra. The advantage of this approach relative to 3D Fourier Analysis is that the dwell time can be shorter. The method, including some experimental results, are described in [Abileah, 2006A], [Abileah, 2006B], and [Abileah, 2010].

The primary output of these methods is typically a bathymetry chart, sometimes also referred to as a nautical depth chart. It is noteworthy that all WKB methods can also provide a map of the ocean surface current. For bathymetry, the current is considered a nuisance parameter, not the primary product of interest. However, some users are actually more interested in mapping currents, for example to detect rip tides or river outflows ([Abileah, 2007]).

For the end users of any bathymetric survey, the important considerations are cost, turnaround time, depth accuracy, and spatial resolution. With respect to the first two criteria, cost and turnaround, the known WKB systems compete very well with other bathymetric methods. However, depth accuracy and spatial resolution are found wanting in the 2D and 3D Fourier Analysis methods. The resolution is so poor that even with the significant cost benefit, WKB has attracted little commercial interest. Other, much more costly technologies (side scan sonar, airborne bathymetric LIDARs) are used for most actual commercial bathymetry surveying.

The reason for the poor performance has to do with a fundamental limitation of Fourier transforms. An excellent discussion of the issues can be found in [Piotrowski et al., 2002]. Briefly, the problem is that the depth accuracy with these methods is proportional to the resolution of the wavenumber-frequency transform, which in turn is inversely proportional to the image cube dimensions, the length on a side of the XY tiles, and the dwell time, T. The 2D and 3D processing algorithms are a compromise between depth accuracy and resolution.

For example, suppose that 3D Fourier Analysis is performed using tile-cube dimensions of 250 m×250 m×100 s and achieves a respectable 10% accuracy in depth. If the spatial dimensions are reduced to 25 m×25 m to get better spatial resolution, then according to Piotrowski et al., the depth error blows up by a factor 10 (from 1/250 to ⅕₂₅) and the error is then 100% of depth. A bathymetry chart with 100% error is not useful. 2D Fourier Analysis can achieve good depth estimates with shorter dwell time, and the spatial resolution can be slightly better than for 3D Fourier Analysis, but the depth accuracy is still limited by the XY tile dimensions used for processing.

In summary, the mathematical approach used in 2D and 3D Fourier Analysis cannot achieve high depth accuracy and spatial resolution simultaneously. For this reason, WKB has had limited commercial success up to now. However, it is still useful to understand how the methods work, as the instant invention uses related method steps and concepts.

3D Fourier Analysis: Several versions have been described; all use a three-dimensional Fourier transform, but other details may differ. The following description is closest to the implementations in [Hoogeboom 1986], [Dugan et al., 2000], and [Trizna, 2001].

A sequence of raw images is obtained. Pre-processing removes image sensor artifacts (e.g., bad pixels) and orthorectifies the images into fixed-Earth Cartesian coordinates using standard methods. Next, the images are partitioned into tiles of dimensions X by Y, usually square. The spatial dimension is driven, as mentioned above, by the resolution vs. accuracy tradeoff. For purpose of illustration, assume that the tiles are 250 m×250 m and that the full image area is 5 km×5 km. There are thus (5000/250)×(5000/250)=400 tiles. If the tiles are overlapped 50% in each dimension (meaning that tile centers are separated by 125 m in each dimension), there will be (5000/125)×(5000/125)=1600 tiles. A calculation is then made for each tile to obtain a best fit to the gravity wave dispersion formula using average depth of the tile as a fitting parameter. The calculation produces one depth solution per tile. That is, the entire XY area is represented with one depth value; there will be 400 depth estimates over the entire 5 km×5 km image with non-overlapping tiles or 1600 depth estimates with overlapping tiles.

Let S represent the space-time cube of N images $\{S_1(\vec{x}), S_2(\vec{x}) \ldots S_N(\vec{x})\}$ for one tile. The images are taken at intervals 2 so that the time span is $T=(N-1)\tau$. The cube is transformed into a wavenumber-frequency power spectrum with a 3D Fourier transform, $\Im_3$:

$$P(\vec{k},\omega) = \Im_3[\{S\}]|^2.$$

In the transform space, wave energy is found to be concentrated in a thin wave dispersion shell which can be easily separated from non-wave energy [Nieto-Borge and Soares, 2000]. The depth, d, and the ocean current vector, $\vec{u}$ are determined by finding the best fit of the gravity wave dispersion equation, $\omega_0(\vec{k}|d,\vec{u})$, to the measured power spectrum, P.

The best fit is usually found by seeking to minimize/maximize some objective function J on the power spectrum. For example, [Tang et al., 2008] suggested using $$argmin_{d,\vec{u}} J_{Tang} = \sum_{k_x,k_y} W(\vec{k}) \sum_{\omega} \left(\omega \pm \omega_0(\vec{k}|d,\vec{u})\right)^2 P(\vec{k},\omega).$$

$W(\vec{k})$ is not absolutely essential, but is recommended to improve the accuracy of the solution. An appropriate W can increase the signal-to-noise ratio (SNR) of waves by assigning greater weight to the wavenumbers with ocean wave energy and less weight where there is more noise than waves based on knowledge of where such energy is likely to be present. A separate algorithm is required to derive the optimum W (see [Abileah, 2010] and [Tang et al., 2008]).

2D Fourier Analysis: As in 3D Fourier Analysis, a sequence of images are pre-processed through ortho-rectifications to fixed-Earth Cartesian coordinates, and the image space is partitioned into XY tiles. Processing proceeds one tile at a time. The 2D Fourier transform $\Im_2$ is applied to each of the N images, producing the 2D complex spectra, $$F_n(\vec{k}) = \Im_2[S_n(\vec{x})]. \quad (1)$$

A wave propagation kernel is defined as, $$\Phi_\pm(k_x,k_y|d,\vec{u}) \equiv e^{\pm i\omega_0(k_x,k_y|d,\vec{u})\tau}$$

The sign in the exponent depends on whether the waves are traveling in +x or −x. Assume that the xy coordinates are rotated such that all waves propagate approximately parallel to the x-axis. Whether the primary wave direction is +x or −x is usually obvious by inspection: waves normally travel towards the shore. To automate the algorithm one can also determine the correct sign based on a test of the inter-frame coherence. The condition $$\langle (\Phi_+ F_n)^* F_{n+1} \rangle > \langle (\Phi_- F_n)^* F_{n+1} \rangle \quad (3)$$

implies that waves are propagating in +x and $\Phi_+$ should be used. If the direction of the inequality is reversed, use $\Phi_-$. In the open ocean one often finds different waves systems (e.g., swell waves and wind waves) traveling in opposite directions. This is unlikely to occur near shores where all waves travel more or less towards shore. For purpose of bathymetry, the complication of opposing wave systems is not important.

For gravity waves, the Fourier transform at time step n is simply related to another at time step n+m by the equation $$F_{n+m} = \Phi_\pm^m F_n.$$

Using this relationship, depth can be determined from a pair of images, $\{S_1(\vec{x}), S_2(\vec{x})\}$ by minimizing the objective function $$argmin_{d,\vec{u}} J_\Delta = \sum_{k_x,k_y} W(\vec{k}) |F_1 - \Phi^{-m} F_2|^2.$$

This algorithm was first described in [Abileah, 2007]). Experimental results on real data were reported earlier in [Abileah, 2006A, 2006B].

The extension to more than two images is simply a sum over a multiple of image pairs ([Abileah, 2010]), $$argmin_{d,\vec{u}} J_\Delta = \sum_{k_x,k_y} W(\vec{k}) \sum_{n=1}^{N-m} |F_n - \Phi^{-m} F_{n+m}|^2$$

History

The physics of how ocean waves are transformed in shallow depth has been known for over a century. The earliest literature suggesting the application to bathymetry, [Biesel, 1952], [Hart and Miskin, 1945], [Williams, 1946], and Fuchs, 1953], was written long before adequate computing and sensor technology existed. The key enabling technologies for wide use of WKB came in the 1980s. These were: the fast Fourier transform (invented in the mid 1960s), an appreciation of the use of Fourier transforms for analysis of ocean waves (about 1980), and increasingly more effective digital imaging systems (1980 to present).

The Fourier transform is needed to compute the frequency-wavenumber spectrum. Theory predicts that energy of linear gravity waves concentrates in frequency-wavenumber space on a thin shell or manifold. Two seminal papers appearing in the 1980s, one on visible light imaging [Gotwols and Irani, 1980] and the other on marine radar imaging [Young et al., 1985], proved the theory correct in relatively deep water.

Right on the heels of [Young et al.], a Dutch team tested a marine radar on the dunes of Scheveneingen beach, imaging shoaling waves. With their initial data they demonstrated that the wave dispersion spectrum shifted from deep water to shallow as predicted by theory [van Halsema and Kleyweg, 1986 & Hoogeboom, 1986]. The Hoogeboom paper at the IGARSS'86 conference in Zurich was the first public presentation of WKB with the 3D method.

Others repeated and improved on the Dutch success in the following 25 years (from 1986 to the present), all using some variation of the 3D algorithm. Table 1 summarizes the major research efforts. The table also lists the tile-cube dimensions used. The cube dimensions are not always explicitly stated in papers and in some cases have to be deduced from several sources. Some of the bathymetry results by the GKSS (Germany) researchers are based on their so called DiSC algorithm that does not tile and is claimed to produce better spatial resolution than achieved with the traditional tile method.[2]

[2] The DiSC algorithm is claimed to improve resolution over the conventional 3D tiles. It starts with a 3D Fourier transform as in other 3D methods, then inverse Fourier transforms a narrow frequency range into XY [Sent et al., 2008]. The idea is that a single frequency wave shifts to higher wavenumber as it propagates into shallower water. Some limited DiSC test results are presented in the literature and show neither improved resolution or depth accuracy.

TABLE 1

History of 3D WKB

| Principal Investigator/ Organization/ Sensor | Year | Reference | Tile-cube dimensions | |
|---|---|---|---|---|
| | | | Spatial (meters) | Temporal (seconds) |
| Hoogeboom/TNO, the Netherlands/ Marine X-band Radar | 1985 | van Halsema and Kleyweg, 1986 Hoogeboom, 1986 | 750 | 100 |
| Smith/DSIR, New Zealand/Doppler Radar | 1991 | Smith et al., 1991 | 320 | 60 |
| Dugan/Arete/ Airborne IR camera | 1995 | Dugan et al., 1996 Farber et al., 1995 | ~1000 | 70 |
| Bell/Proudman Oceanographic Laboratory, UK/ Marine X-band radar | 1999 | Bell, 1999 Bell et al., 2001 Bell et al., 2004 | ~300 | 160 |
| Hessner/GKSS/ WaMos II radar | 1999 | Hessner et al., 1999 | 300 × 600 | 121 |
| Dugan/Arete/ AROSS airborne camera | 2000 | Dugan et al., 2000 Piotrowski and Dugan, 2002 Dugan et al., 2001 | 256 | 128 |
| GKSS, Germany/ WaMoS radar | 2003 | Dankert, 2003 | N/A | 128 |
| GKSS Germany/ WaMoS II radar | 2005-2009 | Flampouris et al., 2009 Flampouris, 2006 Senet et al., 2008] | N/A | 460 |
| GKSS Germany/ WaMoS II radar | 2009 | Hessner and Bell, 2009 | 240 | 600 |

Another approach to WKB has been developed specifically for conditions where the predominant waves are swell. The unique features of swell is that the waves are highly coherent, and the structure of crests and troughs can be easily identified and tracked over a time period, either by eye, or by some standard image processing algorithm such as optical flow. Theory tells us that the wave frequency is constant for a wave propagating from deep water to shore. Only the wavelength, and velocity (wavelength and velocity being related by a simple formula) change with depth. The wavelength can be measured by the distance from one crest to the next, and velocity can be measured by the displacement of a wave crest in the time interval between two images. Very precise depth estimates and good resolution is possible. There are no Fourier transforms and the aforementioned problems with Fourier transforms are eliminated. One example of this principle put into practice is the 1985 work of scientists at the Naval Research Laboratory-Stennis Center with a pair of images taken six seconds apart with an aircraft reconnaissance camera [Caruthers et al., 1985]. The wave crests in each image were manually traced and recorded and depth determined from the apparent crest displacement in the six-second interval. In actual fact, the wave conditions in the Caruthers et al. data were not ideal swell waves (rather, they were a combination of swell and wind waves), which partially explains their 30-40% depth errors. (The other explanation is errors from the manual tracing of wave crests.) More recent work with this technique is given by [Stockdon and Holman, 2000] and [Takewaka, 2000] using full digital imaging and data processing. All these works are unable to separate the effect of depth and currents. They implicitly assume that the current is zero in the direction of wave propagation. If the current is not zero, the estimated depth is biased.

The 2D approach was motivated by the introduction of the IKONOS satellite, launched in 1999. Before the IKONOS satellite, commercial satellites were generally taking only single images of an area of interest. IKONOS had a camera re-pointing capability such that the same area could be imaged 6-7 times during an overpass, at intervals of approximately 13 s. It was then possible to consider using IKONOS imagery for WKB, but the conventional 3D algorithms could not be used. The imaging geometry changes quickly in satellite orbits, limiting the effective dwell time to the interval between two images (13 s). For such short dwell times the rms error of the 3D method is 100% of depth.

The 2D approach solved this problem, and an early version of the 2D process was applied to pairs of IKONOS images of the San Diego inlet area [Abileah, 2006A, 2006B, & 2007]. An updated version of the 2D was applied to X-band radar images obtained by Dr. Dennis Trizna with his experimental radar at the US Army Corp of Engineers Field Research Facility (FRF) [Abileah, 2010].

It is apparent, however, that the mathematical approaches used in 2D and 3D Fourier Analysis cannot achieve high depth accuracy and spatial resolution simultaneously.

SUMMARY OF THE INVENTION

Systems and methods for acquiring accurate maps of near-shore depth and surface currents are disclosed. An imaging platform is provided which is able to obtain a time series of overhead images of an area of a body of water having pixel intensity correlated with wave height. The platform may be on a tower, or may be airborne, space-borne, or ship-borne. The imaging modality may be optical, radar, or LIDAR. Image processing corrects the images, as and if needed, such they are mapped onto a grid of fixed coordinates, and the pixel intensities have a near linear relationship to wave height. A two-dimensional Fourier transform of each image is obtained, then the extremum of an objective function is found, wherein the objective function is a function of the depth and surface current (velocity) vector at each pixel location, and the extremum is sharply peaked at a particular set of depth and a particular set of surface current vector values. A pixel-by-pixel map of depths and or currents can be produced.

DETAILED DESCRIPTION

Before the present invention is described in detail, it is to be understood that unless otherwise indicated this invention is not limited to specific bodies of water or specific imaging modalities. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a sensor" includes two or more sensors, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Where the term "image" is used herein, it is understood that the image may be either a visual representation or an analog or digital numerical representation thereof. The original sensor may or may not be optical. For example, an image can be a visual or numerical representation of radar or LIDAR data. Images may be "obtained" by any suitable means. In some cases a complete measurement system may include a camera on an aircraft, for example, or a shore-mounted radar system. In other embodiments, the images may be obtained by, for example, receiving or purchasing the image data from an image provider, for example, a provider with access to images or who owns a satellite-mounted camera. Similarly, images may be obtained by retrieving images from a library of stored images.

The methods disclosed herein will generally be described using examples for ocean waves, but can be applied, in principle, to any body of water where the depth is shallow enough to influence the surface wave velocity, and sufficient waves are present. Generally, short wavelength wind-driven waves are required, and these are most reliably available in shore regions exposed to the open ocean, which is where the methods have been found to be most useful.

The instant invention evolved from the inventor's research on the 2D Fourier analysis method discussed in the Background section. The new methods are the first instances of wave-kinematics bathymetry (WKB) algorithms that combine both forward 2D Fourier transforms and 2D inverse Fourier transforms to achieve both high depth accuracy and high spatial resolution. In addition, the new methods are able to use shorter dwell times compared to the prior art 3D algorithms.

The new mathematical approach to WKB described herein eliminates the need to partition the image into tiles as described above in the Background section, and provides greatly improved spatial resolution relative to all prior art 2D and 3D Fourier Analysis methods. The spatial resolution limitation described for the prior art is overcome. There is no need to tile the data. The spatial resolution is no longer tied to the XY and T dimensions. Arbitrarily high resolution is possible, limited only by the signal-to-noise ratio (SNR).[3] Table 2 summarizes the typical spatial resolutions achieved in practice with the new approach compared to the previous algorithms.

[3] SNR refers to the ratio of the image intensity variation due to ocean waves ("signal") relative to variation due to image noise. A more common (but less precise) term is wave contrast. However one defines it, an image with clean and distinct ocean waves would be considered high SNR, an image with very grainy and difficult to recognizable waves would be considered low SNR.

TABLE 2

| Comparison of methods for similar depth accuracy | | | |
|---|---|---|---|
|  | 3D | 2D | New method, with high SNR images |
| Spatial resolution | 250 m | 125 m | 20 m or better |
| Dwell time | 100 s | 10 s | 10 s |

In the new approach, the spatial resolution does not depend on the processing tile dimensions. In fact, the processing can proceed with the entire image area treated as one huge tile. In certain instances, it may be convenient or expedient to partition the processing of the entire image into several tiles, but here, for clarity, we assume the entire image is processed as one.

As for the 3D and 2D Fourier Analysis methods, let S represent the space-time cube of N images $\{S_1(\vec{x}), S_2(\vec{x}), \ldots, S_N(\vec{x})\}$. But now, S is the entire image footprint of the camera or radar, not a small tile. Paralleling the example given in the Background section, exemplary spatial dimensions of S are 5000 m×5000 m.

The 2D Fourier transform, $\mathfrak{I}_2$ is applied to each of the N images, producing the 2D complex spectra, $$F_n(\vec{k}) = \mathfrak{I}_2[S_n(\vec{x})]$$

exactly as in the 2D Fourier Analysis method, except that the image has not been tiled.

A depth solution is obtained by minimizing the objective function, $$\mathrm{argmin}_{d,\vec{u}} J_\Delta(\vec{x}) = \mathfrak{I}_2^{-1} W(\vec{k})(F_1(\vec{k}) - \Phi^{-1} F_2(\vec{k}))|^2.$$

This equation is similar to the 2D Fourier Analysis method, but with one important difference: the process includes the inverse Fourier transform, the $\mathfrak{I}_2^{-1}$ operator. The argmin thus obtains a depth solution for every image pixel, instead of one depth solution for every tile as in the 2D and 3D methods.

To better understand the process, note that $\Phi^{-m}F_2$ is the second image of the pair propagated to the time of the first image. $\Phi$ is the gravity wave propagation function, $$e^{\pm i\omega_0(\vec{k}|d,\vec{u})\tau},$$

and $\omega_0$ is given by either the linear gravity wave dispersion formula $\omega_0(\vec{k}|d,\vec{u})=\sqrt{g|k|\tanh(|k|d)}-\vec{k}\cdot\vec{u}$ or the non-linear gravity wave dispersion formula $\omega_0(\vec{k}|d,\vec{u})=\sqrt{g|k|\tanh(|k|d(1+\alpha H|d))}-\vec{k}\cdot\vec{u}$, as discussed in the Background section (paragraph [005]).

The difference $F_1-\Phi^{-m}F_2$ will be at minimum when the propagation kernel is tuned to the appropriate depth and current. The difference is computed in wavenumber space. The inverse Fourier transform operator, $\mathfrak{I}_2^{-1}$ transforms the difference into the spatial coordinates, $\vec{x}$. The $\|\|^2$ term then turns the difference into a power measure. Minimizing this power is the objective that provides the best depth-current solution. Another way to explain the process is that the kernel $\Phi$ focuses waves so that they self cancel at the location where the propagation kernel is matched to the depth and current appropriate for that location.

W is the same weighting function used in the 2D and 3D Fourier Analysis methods, and for the same purpose. As in those methods, an appropriate W can increase the signal-to-noise ratio (SNR) of waves by assigning greater weight to the wavenumbers with ocean wave energy, less weight where there is more noise than waves, based on knowledge of where such energy is likely to be present.

Since some noise is always present in real world images, the objective minimum will also be noisy. W can provide some noise filtering but does not eliminate all noise. To improve results, we seek to minimize the power summed over a sliding window $A(\vec{x})$. The minimization is modified as follows:

$$argmin_{d,\vec{u}}J_\Delta(\vec{x}) = \sum_{A(\vec{x})}\left|\mathfrak{I}_2^{-1}\left[W(\vec{k})(F_1(\vec{k})-\Phi^{-1}F_2(\vec{k}))\right]\right|^2.$$

The size of the sliding window A can be made as small or large as required. Of course, making A larger compromises the resolution, but not as severely as 2D and 3D tiles.

Other objective functions can accomplish the same result. For example, the objective can be to maximize the coherent sum of a pair of images, $$argmax_{d,\vec{u}}J_\Pi(\vec{x}) = \sum_{A(\vec{x})}\left|\mathfrak{I}_2^{-1}\left[W(\vec{k})F_1(\Phi^{-1}F_2)^*\right]\right|^2.$$

Figure 1:
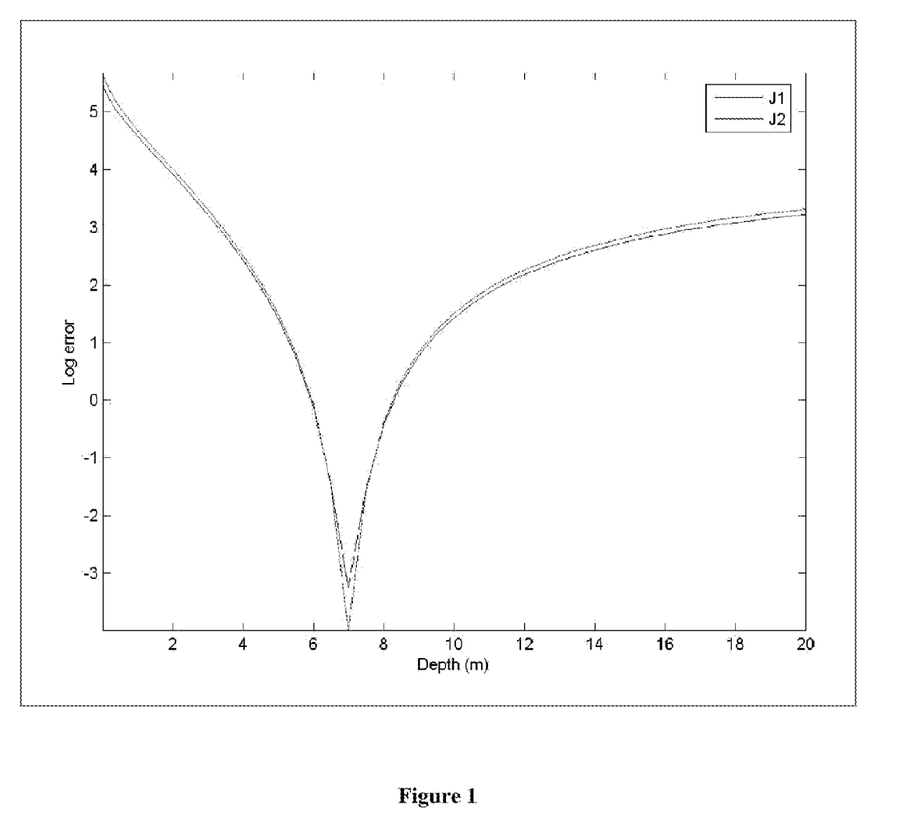
FIG. 1 compares depth accuracy for two objective functions on simulated ocean waves propagating over a constant depth of 7 m.

FIG. 1 compares $J_\Delta$ to $J_\pi^{-1}$ on simulated ocean waves propagating over a constant depth of 7 m. The log error (log of the objective function) is plotted against depth on the x-axis varying from 0 to 20 m. The upper curve is log $J_\Delta$, the lower curve is $-\log J_\pi$. Both show a steep minimum at the correct depth. The two objective functions accomplish essentially the same thing. Henceforth, $J_\Delta$ will be used as exemplary.

Besides the improved spatial resolution, there are other benefits to the new methods. First, there is a significant saving of computations. It is generally more efficient to process a 5000 m×5000 m area as one super tile than as 400 non-overlapped small tiles, or as 1600 overlapped tiles as described in the Background section for prior art methods. This is because large fast Fourier transforms (FFTs) are more efficient than small FFTs. There is also no wastage due to edge effects, pre-FFT windowing, etc. Another benefit is that there is no need for overlapped tiles. Yet another benefit of the new methods is that the depth estimation is less susceptible to "interference" from land, ship, rain, clouds, surfactant streaks, wave breaking, surf, and anything else that is not pure ocean waves. The Fourier transform mixes water waves and interference signals, and thus, interference will cause larger errors in depth estimation for tiled images as used in the prior art. The inverse Fourier transform of the new methods separates waves and interference spatially. A pixel far enough from the interference is then unaffected. A good depth estimate is possible in a given location as long as the location is a distance $\tau v$ from the interference, where $\tau$ is the time between the image frames and V the approximate wave velocity.

In further embodiments of the present invention, if there are more than two images available, multiple image pairs can be combined by some sort of averaging. The benefit of averaging is further reducing errors due to noise. One form of averaging of the $J_\Delta$ objective function is given by $$argmin_{d,\vec{u}}J_\Delta(\vec{x}) = \sum_{n=1}^{N-m}\sum_{A(\vec{x})}\left|\mathfrak{I}_2^{-1}\left[W(\vec{k})(F_n(\vec{k})-\Phi^{-m}F_{n+m}(\vec{k}))\right]\right|^2.$$

This is general for any value of frame intervals, m. Usually, m=1 is used, which means that the function uses pairs of consecutive images. However, when there are more than two images, there is an opportunity to use other spacing. For example, m=2 would form pairs from odd- and even-numbered images. Larger separations of image pairs can improve the accuracy of the results in some circumstances.

In still further embodiments of the present invention, another average can sum over a set of m values, M, so that several or all possible image separations are used.

$$argmin_{d,\vec{u}}J_\Delta(\vec{x}) = \sum_{m\in M}\sum_{n=1}^{N-m}\sum_{A(\vec{x})}\left|\mathfrak{I}_2^{-1}\left[W(\vec{k})(F_n(\vec{k})-\Phi^{-m}F_{n+m}(\vec{k}))\right]\right|^2. \quad (4)$$

The other forms of $J_\Delta$ are just special or degenerate cases of Eqn. 4.

An important aspect of the new method is that depth is determined pixel-by-pixel rather than tile-by-tile by solving a suitable objective function operating on a pair of 2D Fourier transforms. The adjustable parameters are: N, the total number of images available for pairing; the set M of interval between paired images; A, an averaging area; W, a wavenumber weighting function. Fitting parameters are the depth and current vector for each pixel in the preprocessed image area.

There is considerable latitude in the choice of the adjustable parameters. Often, the choice is dictated more by sensor and operational considerations than physics. But to the extent that there are choices in the implementation, the following are helpful guidelines. N is at least 2, but more images are useful to average out noise. Making A larger also averages out noise at the expense of spatial resolution. The choice of m defines the time interval mτ between paired images. In practice, the time interval can be anything from an infinitesimal fraction of a second to many tens of seconds. The optimum value is a compromise of competing factors. With a perfect (noise free) image of ocean waves an infinitesimal time difference is sufficient to measure the phase changes that lead (through use of Eqn. 4) to precise current and depth. However, in practice there is noise and a longer interval is required to enable accurate wave displacement measurement (or phase shift measurement in the Fourier domain), which, in turn, gives more accurate determination of current and depth. There is no theoretical limit to how long that interval can be as long as the gravity waves stay coherent in accordance with the gravity wave dispersion equation. In reality, the coherence diminishes with time by wave breaking, bottom friction, and refraction and speed change as waves propagate over a varying bottom depth—all factors which are not accounted for in the simple gravity wave dispersion equation. Also, since a goal of the present invention is to attain high spatial resolution of potentially complex and rapidly changing depth profiles, the time interval should not be longer than the desired resolution divided by the wave speed. To illustrate this point: for very shallow depth, the speed of waves of all wavenumbers approaches $\sqrt{gd}$ m/s. Suppose a 15 m spatial resolution is desired on the 5-m depth contour. The wave speed is $\sqrt{gd}=7$ m/s. Then the interval between frames should be 2 seconds or less. Given all these considerations, a time difference in the range of 1-3 seconds has been found to be a good compromise between the competing needs for longer time to measure phase change and shorter time to maintain the validity of the dispersion equation and achieve high spatial resolution.

Implementation Details

Additional details of computer implementation, including general and more efficient ways to search for the minima in the cost function are now presented. The description will be for the objective function of Eqn. 4 which encompasses the other possible objective functions by appropriate choices of parameters in the sums defined in Eqn. 4.

Figure 2:
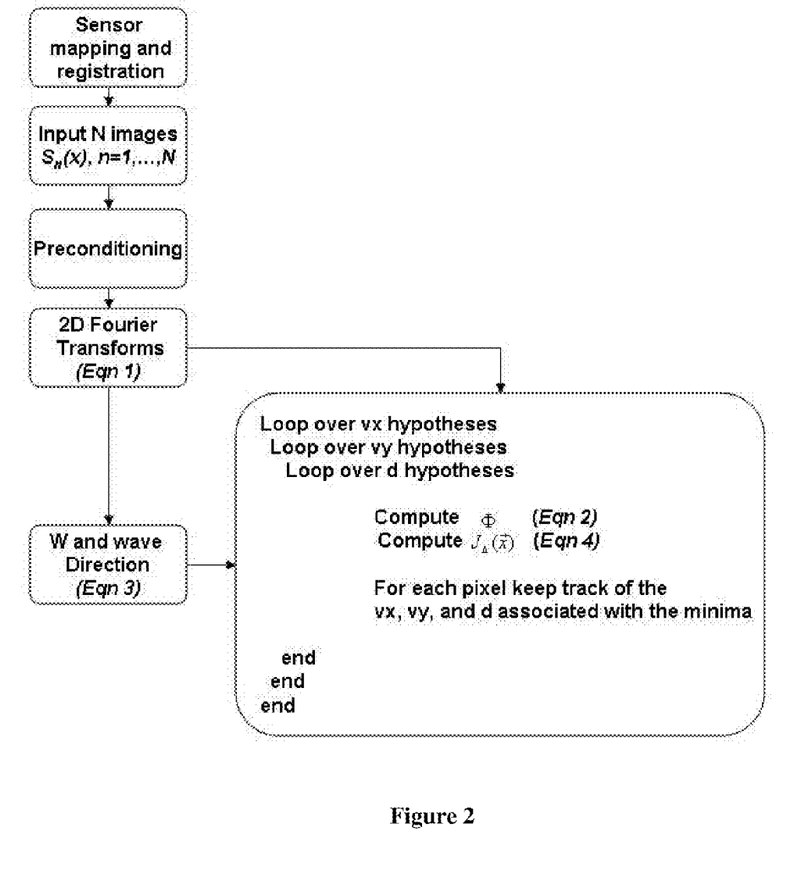
FIG. 2 shows a flowchart for an exhaustive search algorithm.
Figure 3:
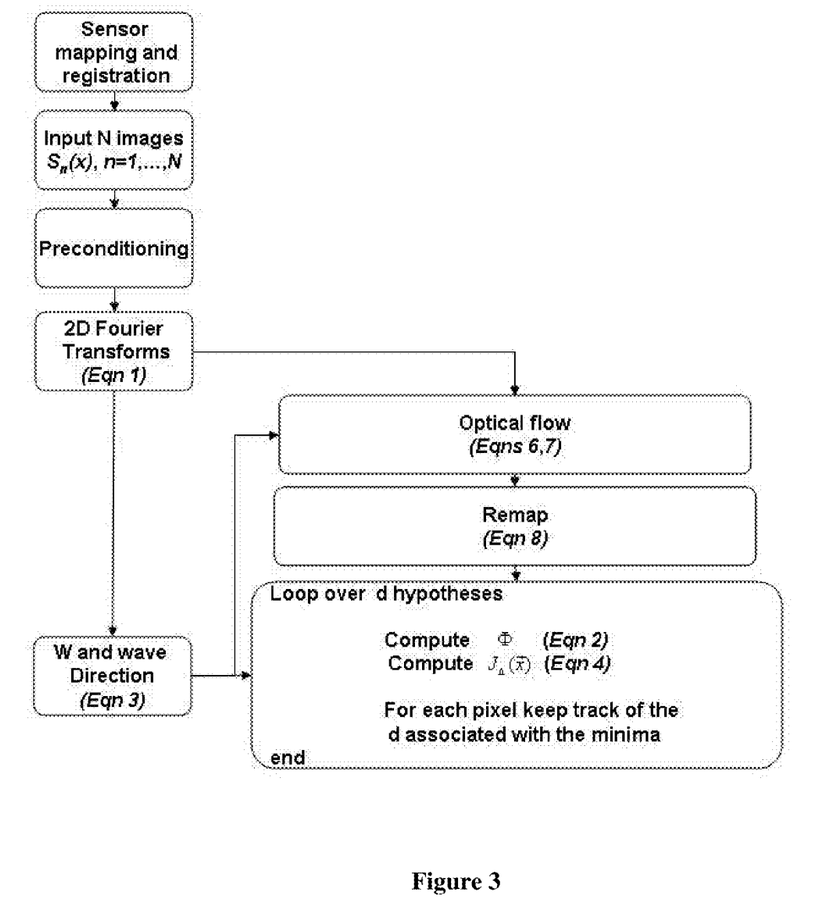
FIG. 3 shows a flowchart for a more efficient algorithm.

Two implementations that achieve the same result are described. FIG. 2 shows an "exhaustive search" where every possible combination of depth and current speed are examined. FIG. 3 shows a serial process that first finds the best solution for current speed, then goes on to search the depth.

Following the flow illustrated in FIG. 2, the exhaustive search process begins with the sensor acquiring two or more consecutive images of the ocean surface. As previously noted, the time between images can be in the range of sub-second to tens of seconds, but typically would be about one second.

As described in the Background section, preliminary sensor-specific image processing is usually applied including ortho-rectification and image registration. There may also be camera distortions corrections, pixel gain corrections, bad pixels replacement with interpolations, adjustments for image nonlinearities, compensating radar intensities for the radar range-equation, etc. The specifics do not concern us here. The important assumption for this and all WKB algorithms is that there is a series of images mapped into a grid of fixed-Earth coordinates, and that the pixel intensities have a near linear relationship to wave height.

Additional preprocessing may be desired to clean-up phenomenological clutter such as wave breaking and surface surfactant streaks. Wave breaking and whitecaps have abnormal intensities that would contaminate the WKB results. With optical systems, breaking waves can be determined with multi-spectral methods [Abileah, 2007]. With radar data, breaking waves are detected as sea spikes. In either case, as many breaking waves as possible are identified and replaced with interpolated good data. Surface surfactant streaks are "dark," both in optical and radar images.

The next step is to compute the 2D Fourier transforms of all the images, which prepares the data for subsequent processing. A wavenumber mask, W(k), of zeros and ones that selects the wavenumbers with ocean waves, eliminates those wavenumbers that are mostly noise or non-wave clutter. The specifics do not concern us here other than to assume that W(k) intelligently selects that portion of the Fourier transform space where ocean wave have a high signal-to-noise. The sign of the dominant wave direction is determined by Eqn. 3.

The minimum search requires three loops. These loops make an exhaustive search over all current velocity in the x-direction, $v_x$, current velocity in the y-direction, $v_y$, and depth, d. For each $\{v_x, v_y, d\}$ hypothesis, compute the wave propagation kernel (Eqn. 2), and apply it in the three-sum cost function (Eqn. 4). As the loops advance through all possible combinations we keep track in each pixel of the $\{v_x, v_y, d\}$ corresponding to the minimum. When all loops are done, these three variables are determined and mapped as a function of x and y.

The number of hypotheses can be large. Typical ocean current velocities are <2 m/s. A possible choice of current speed hypotheses is −2:0.1:2 (0.1 m/s steps from −2 to +2 m/s). For depth, typical choices are 1:0.5:25 m. The total number of hypotheses in this case is ~82,000. Each hypothesis involves one or several inverse FFTs, depending on the number of m-values. The total number of computations is large, even for today's powerful scientific workstations.

The computational complexity can be reduced, possibly by as much as 1000-fold over the exhaustive search by separating the current and depth search. This is possible by exploiting the fact that short wind waves do not "feel" the bottom. Their propagation is predictable and independent of depth and only affected by the unknown ocean surface current. A computational advantage is then realized by first using the short waves to estimate the current. The images are then remapped using rubber sheeting algorithms to effectively remove current displacement. The depth search can then be made without concern for current.

There are many ways to implement this approach. For example, the above exhaustive search method can be executed twice in serial fashion, first running only the velocity search loops (depth=∞), then repeated (after rubber sheeting) with only the depth search. This simple rearrangement would reduce the number of hypotheses in the above example from ~82,000 to ~1,700, a 50-fold reduction. Another approach is to use a hill climbing algorithm, although some care is needed to avoid local maxima/minima. One can also use the high wavenumbers to estimate the current only, invoking assumptions that current is less variable than depth. One can estimate the current in one small area and assume the current in nearby areas is approximately the same (invoking the assumption that the current is typically cross-shore and the direction is known). One can base the current on very different physics, for example, by estimating the current using non-wave energy and image features such as floating foam or surfactants (which works very well with optical images of some bodies of water).

An elegant WKB-based approach, with additional savings in computations, uses Lucas-Kanade (LK) optical flow, as shown in FIG. 3. The LK and rubber sheeting methods are well-known in the art. The following however, explains special considerations for their use in combination with WKB.

The initial processing, including estimating the W mask and wave direction are the same as before. Let $k_c$ be the critical wavenumber separating long and short waves. Additionally define a wave cutoff mask H(k)=1 for |k|>$k_c$, otherwise H(k)=0, so that the product mask WH selects short waves. There is, of course, no precise line between long and short waves. The idea is to isolate waves that are short enough to be little affected by the depth, but sufficient to estimate current. A typical cutoff wavenumber is $k_c$=0.2 c/m. This is equivalent to defining short waves as ≤5 m.

Define the wave propagation function $$\Psi_\pm(k_x,k_y) \equiv e^{\pm i\omega_0(k_x,k_y|\infty,0)\tau} \quad (5)$$

which is similar to Eqn. 1 but specifically for infinite depth and zero current. Infinite depth is appropriate because this propagation kernel will only be used on short waves that propagate as deep water waves. The current velocity is zero because the current is left to be determined with optical flow. Optical flow will process pairs of images, $F_n$ and $F_{n+m}$. If there are more than two images, the final results will be the average of all pairs. For each pair, apply the wave propagation and short wave filter kernel, $$I_1 = \mathfrak{I}_2^{-1}[W(\vec{k})H(\vec{k})(F_n(\vec{k}))]I_2 = \mathfrak{I}_2^{-1}[W(\vec{k})H(\vec{k})\Psi^{-m}F_{n+m}(\vec{k}))] \quad (6)$$

$I_1$ is thus the first image with the long waves filtered out. $I_2$ is the second image, also with the long waves filtered out, and with short waves propagated to the time of the first image. In the absence of current we expect $I_1=I_2$. LK approximates the displacement field $\delta(\vec{x})$ from the change in image intensity, $\delta I = I_1 - I_2$, $$\delta(\vec{x}) = (\langle g(\vec{x})g^T(\vec{x})\rangle)^{-1}\langle g(\vec{x})\delta I(\vec{x})\rangle, \quad (7)$$

where $g(\vec{x})=(\vec{\nabla}I_1(\vec{x})+\vec{\nabla}I_2(\vec{x}))/2$. The expectation operators ⟨ ⟩ are averages of some area A centered on location $\vec{x}$. This serves the same purpose as the area summing in Eqn. 4.

It may be noted that there are efficient implementations of Eqn. 7 that perform all calculations with the Fourier transform of the images. In that case there is no need to produce the intermediate image data with Eqn. 6, and the need for the two inverse Fourier transforms is eliminated.

$F_{n+m}$ is then modified by a rubber sheeting operator R where the image intensities will be backward shifted in proportion to the estimated current displacement. Since R operates on image data in xy, it is essential to first inverse transform F to xy, then apply the rubber sheeting operator, and then re-Fourier transform to prepare for the depth search:

$$F_{n+m} = \mathfrak{I}_2(R(\mathfrak{I}_2^{-1}[F_{n+m}(\vec{k})]|\delta(\vec{x}))). \quad (8)$$

Now Eqn. 4 is applied but with no need to search on current velocity.

The basic optical flow, Eqn. 7 is an approximation valid only for sub-pixel displacements. Optical flow algorithms deal with larger displacements by first estimating a bulk shift between the two images by other traditional image registration methods, then using optical flow to refine to sub-pixel displacements.

Example with Simulated Data

Embodiments of the new method have been tested on satellite optical, radar, and LIDAR images of ocean waves. In all cases, results appeared to validate the approach. However, evaluation cannot be truly complete without detailed and simultaneously acquired "true" bathymetry and current measurements, which are typically not available or incomplete for real-world data.

At present, data simulations are the only precise way to prove and evaluate the algorithms. In simulations, we have complete control and knowledge of the depth and current field in every image pixel. We can then quantify the accuracy of the results. We can also easily model different ocean wave conditions such as wind waves with strong swell, high wind ocean spectrum, young sea, waves refracted or reflected back by land mass, etc.

Figure 4:
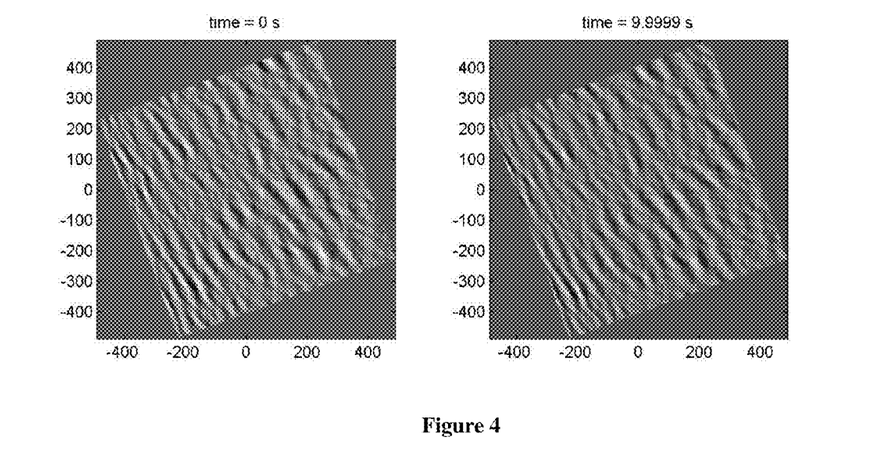
FIG. 4 shows a pair of simulated ocean wave images separated by 10 s.

To illustrate the method and discuss the accuracy, we used a simulation of a Pierson-Moskowitz ocean spectrum for a 10 m/s wind. The simulation data consist of 10 images with areas of 750 m×750 m, at 1 s intervals for a total of 10 s dwell. An image pixel is 1.5 m×1.5 m. The waves are propagated over a linearly sloping depth profile ranging from 1 m on the left edge to 9 m on the right. The simulation was generated with code implemented by Weiss using his wave propagation technique [Weiss, 1997]. FIG. 4 illustrates the first and last of the 10-image set. Spatial axis distances are in meters.

Figure 5:
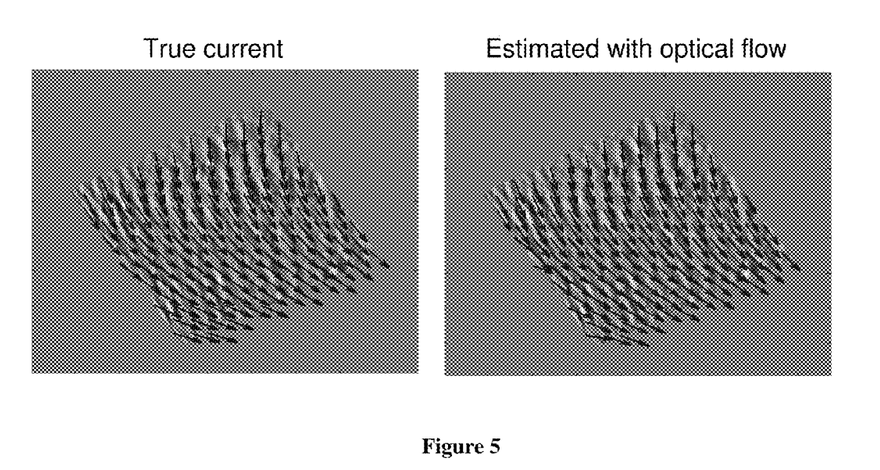
FIG. 5 shows true current fields and current fields estimated using optical flow.

FIG. 5 shows the true (on left) and estimated (on right) current velocity vectors. The estimated currents were obtained using the optical flow method. A vector velocity was obtained for every pixel, but in the plots in FIG. 5 the vectors are thinned out for clarity. The estimated current magnitudes are within 5% rms of the true values and the orientations of the current vectors are correctly estimated. This precise and detailed reconstruction of the current field would be impossible with the prior art tile algorithms (2D and 3D Fourier Analysis).

Figure 6:
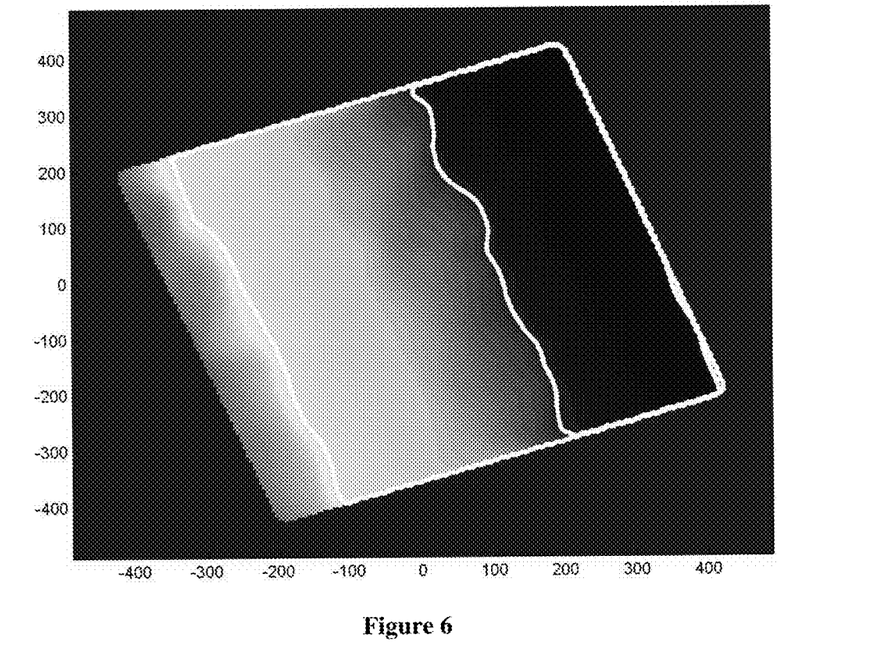
FIG. 6 shows depth solutions for the same data with 4- and 7-m depth contours highlighted.

FIG. 6 is the depth solution with depth contours at 4 and 7 m highlighted as white lines. The actual depth contours in the simulation are parallel to the imaginary coastline to the left. If the algorithm had produced exact depths, the white lines would be straight and parallel. In fact, the lines are not exactly straight and parallel. The wiggles from parallel lines are a measure of the spatial resolution. In this case the contours wiggle<10 m from truth. This demonstrates that the achieved bathymetry resolution is better than 10 m. This supports the claim that the spatial resolution achieved with the new method is much better than the 2D and 3D methods, which could not possibly have produced depth of any reasonable accuracy with tile dimensions of 10 m×10 m. The 2D and 3D Fourier Analysis methods using tile dimensions of 250 m×250 m would produce only four independent depth estimates over the same area. The actual depth slope would be represented by four coarsely sampled "depth soundings" (to use an old expression in depth charting).

It should be apparent to anyone of skill in the art that the depth and current data can be presented to a user in any of a variety of ways commonly used to present and visualize data. The raw numbers can be displayed, for example, in tabular form. Depth contour maps and vector field displays can be provided as in the examples of FIGS. 5 and 6. Two- and three-dimensional cross-sections of ocean bottom profiles can be provided. Depth charts with numbers at selected locations can be provided.

On a laptop computer with a 2 GHz cpu the processing time for the optical flow (for 10 frames) was 16 s, and the depth solution took 54 s. The currents and depth were mapped to the 1.5 m pixel resolution but have an effective 10 m resolution due to the averaging over area A in the objective function. The rms error in depth and the two components of the current velocity were all within 5%.

Applications

The main problem with WKB has, up to now, been poor resolution due to the use of tile processing. The WKB of the instant invention eliminates tiles and brings WKB performance closer to the gold standards, as summarized in the Table 3.

TABLE 3

Performance of various bathymetry methods

| | Depth rms error | Resolution |
|---|---|---|
| Side scan sonar | <5% | 1 m |
| LIDAR | <5% | 4 m |
| Photogrammatic | Up to 50% | 10-20 m |
| WKB-prior art | <5% | 250 m |
| WKB-new | <5% | 10 m |

The new WKB methods are still not quite as good as the gold standards, but they have significantly lower cost. Other advantages are better accessibility to remote areas, faster turnaround, safe surveying in very shallow waters (where operation of ship sonar is not advisable), immunity to turbid waters (where LIDAR fails). The main disadvantage of the WKB methods is the requirement for waves typically only reliably available in oceans. WKB is harder to use in most lakes, bays, inlets, etc. It is not sufficient to just have long waves (i.e., swell). Short wind waves are also essential. There are also days of dead calm ocean when WKB systems must standby for wind and waves to return. WKB can use many existing radar, optical, IR, and LIDAR imaging systems.

Most of the published reports on WKB have used nautical radar fixed on shore towers. These efforts have, in fact, undermined the advancement of WKB by attempting to image the ocean waves at low grazing angles and consequently achieving poor results. The grazing angles are typically <1° and a large fraction of the wave surface may be shadowed [Nieto-Borge and Soares, 2000] resulting in nonlinear distortions of actual wave heights. The Fourier transforms are contaminated by distortion harmonics. The wave dispersion equation on which the WKB relies does not actually apply. Large errors in depth and current estimates result. The present inventor recommends that WKB be used with grazing angles>5' where there is negligible shadowing, and the sensor image intensities are more linear with wave height. The same is true for optical imaging. If grazing angles<5' can not be avoided, appropriate wavenumber filtering (using a suitable modified W) can mitigate some of the harmonic distortions.

WKB is thus recommended for airborne platforms (helicopters, small aircraft, aerostats) and rockets or orbiting satellites, not only to view the ocean at greater grazing angles but also because such platforms enable rapid surveying of large stretches of coastline. The instant invention enables even faster survey speeds, because only two or a few image frames are needed. The invention allows bathymetry to be estimated with dwell times of less than ten seconds where past methods required more than 100 seconds. The practical implication is that a small airborne radar or optical imaging system can survey the entire coastline of the continental U.S. in 40 hours of flight time. This is many orders of magnitude faster (and cheaper) than current conventional bathymetric surveying.

WKB can also be useful from fixed shore platforms, fixed ocean platforms, and ships. For example, WKB can be used with an imaging sensor on a fixed tower to monitor dangerous and rapidly changing currents in shipping lanes, to detect and warn of rip tides at a swimming beach, or to monitor changes in beach morphology after storm surges. A ship-borne system can provide rapid real time map of bathymetry and currents in waters on the ship's path, warning of underwater obstructions and/or dangerous changes in currents, even as the ship is moving at full speed.

The term $\mathfrak{J}^{-1}[W(\vec{k})(F_n(\vec{k})-\Phi^{-m}F_{n+m}(\vec{k}))]|$ in the objective function ($J_A$) represents energy that is not predicted by the gravity wave dispersion model. This can be viewed as a separate and useful byproduct, imaging the non-wave features on and below the ocean surface including features not related to the ocean bottom itself. Applications include:

detecting small vessels and navigation obstacles,
ocean search and rescue,
imaging fish and marine mammals on or near the surface,
surface mine detection,
mapping surfactants,
viewing underwater targets,
viewing the ocean bottom,
benthic surveying.

Both coherent (Doppler) and incoherent (power only) radars can be used. The radars can be phase array and continuous imaging or sweeping pushbrooms. Similarly, optical imaging can be by video, fast frame cameras (e.g., [Dugan and Pietrowski, 2000]) or pushbroom (as in current satellite imaging systems).

The new WKB methods are especially well suited for use with recent commercial high resolution satellites. Satellites pass over an area of interest quickly. Present satellite imaging systems are limited in the number of images that can be taken in one overpass. The 100+ seconds of image data required for conventional 3D cubes is not obtainable, but two to three images over an interval of ten to twenty seconds can be provided. The new WKB methods are thus ideal for satellite data. Furthermore, today's high resolution imagery, with 2 m resolution in multi-spectral bands and 0.5 m resolution in panchromatic mode, easily resolves the short wind waves. Resolution of the short wind waves is needed to accurately estimate the current vectors, and accurate current vectors are essential to accurate depths. With the multispectral images that these satellites provide, it is also possible to accurately detect and edit breaking waves and surfactant streaks. Also, satellite imagery is very cost effective, especially for remote areas where deployment of ships or aircraft is impractical. The cost for acquiring the imagery for WKB is ~$100/km; the cost of processing images into bathymetry products is negligible.

Another method for ocean surface imaging is airborne topographic LIDAR [Wang, 2002]. This is the only sensor that images wave height directly and accurately. The system used by [Wang, 2002] uses a nutating scanning minor to scan a laser beam over the ocean surface in circular patterns. As the aircraft travels, the circular scans produce two ocean images several seconds apart in time. These are the two images that the new WKB method can process into maps of currents and depth.

WKB can also be used to focus on current measurement. For example, rip tides, river outflows, and dangerous current gradients can be measured. The new WKB can resolve these features where the previous tile-based WKB methods cannot.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

REFERENCES

[Abileah, 2006A]: R. Abileah, "Mapping Shallow Water Depth from Satellite," *Proceedings of the ASPRS 2006*, Reno, Nev. May 1-5, 2006.

[Abileah, 2006B]: R. Abileah, "Shallow-Water Bathymetry with Commercial Satellite," *Sea Technology*, June 2006.

[Abileah, 2007]: R. Abileah, "Mapping Ocean Currents With IKONOS," *Proceedings of IEEE Oceans 2007*-Europe, Aberdeen, Scotland, June, 2007.

[Abileah, 2010]: R. Abileah and D. Trizna, "Shallow Water Bathymetry with an Incoherent X-Band Radar Using Small (Smaller) Space-Time Image Cubes," *Proceedings of the IGARSS'10*, Honolulu, Hi., July 2010.

[Bell, 1998]: P. S. Bell, "Bathymetry derived from an analysis of X-band marine radar images of waves," *Proceedings of Oceanology '98*, 3,535-43, 1998.

[Bell, 1999]: P. S. Bell, "Shallow water bathymetry derived from an analysis of X-band radar images of waves," *Coastal Engineering*, 37(3-4), 513-27, 1999.

[Bell, 2001]: P. S. Bell, "Determination of bathymetry using marine radar images of waves," *Proceedings of The Fourth International Symposium on Ocean Wave Measurement and Analysis*, Sep. 2-6, 2001, San Francisco, Calif.

[Bell et al., 2004]: P. S. Bell, J. J. Williams, S. Clark, B. D. Morris, and A. Vila-Concejo, "Nested radar systems for remote coastal observations," *Journal of Coastal Research, SI* 39 (Proceedings of the ICS 2004), 483-487, 2004.

[Biesel, 1952]: F. Biesel, "Study of wave progression in water of gradually varying depth," *US National Bureau of Standards Circular*, 521, 243-53, 1952.

[Caruthers et al., 1985]: J. W. Caruthers, R. A. Amone, W. Howard, C. Haney, and D. L. Durham, "Water depth determination using wave refraction analysis of aerial photography," *Report* 110, *Naval Ocean Research and Development Activity*, 1985.

[Dankert, 2003]: H. Dankert, "Retrieval of Surface-Current Fields and Bathymetries using Radar-Image Sequences," *Proceedings of the International Geoscience and Remote Sensing Symposium*, Toulouse, France, 2003.

[Dugan et al., 1996]: J. P. Dugan, H. H. Suzukawa, C. P. Forsyth, and M. S. Farber, "Ocean Wave Dispersion Surface Measured with Airborne IR Imaging System," *IEEE Transactions on Geoscience and Remote Sensing*, 34, 1282-84, September 1996.

[Dugan et al., 2000]: J. P. Dugan, G. J. Fetzer, J. Bowden, G. J. Farruggia, J. Z. Williams, C. C. Piotrowski, K. Vierra, D. Campion, and D. N. Sitter, "Airborne Optical System for Remote Sensing of Ocean Waves," *J. Atmospheric and Oceanic Technology*, 2000.

[Dugan and Pietrowski, 2000]: J. Dugan and C. Piotrowski, "Developmental System for Maritime Rapid Environmental Assessment Using UAVs," *Proceedings of the Oceanology International 2000* (Mar. 7-10, 2000).

[Dugan et al., 2001]: J. P. Dugan, C. C. Piotrowski, and J. Z. Williams, "Water depth and surface current retrievals from airborne optical measurements of surface gravity wave dispersion," *J. Geophysical Research*, 106, 16903-15, 2001.

[Faber et al., 1995]: M. Farber, H. H. Suzukawa, Jr., and J. Dugan, "Long range airborne IR detection of ocean waves," *Proc. Targets and Backgrounds: Characterization and Representation*, 2469, 526-36, 1995.

[Flampouris, 2006]: S. Flampouris, "Investigation of Correlations between Radar Deduced Bathymetries Due to the Outer Impact of a Storm in the Area 'Salzand'," internal GKSS report No. 2006/16, 2006.

[Flampouris et al., 2009]: S. Flampouris, J. Seemann, and F. Ziemer, "Sharing our Experience using Wave Theories Inversion for the Determination of the Local Depth," *Proceedings of the IEEE Oceans 2009*-Europe, 11-14 May 2009.

[Fuchs, 1953]: R. A. Fuchs, "Depth estimation on beaches by wave velocity methods," Institute of Engineering Research Wave Research Laboratory, 1953.

[Gotwols and Irani, 1980]: B. L. Gotwols and G. B. Irani, "Optical Determination of the Phase Velocity of Short Gravity Waves," *Journal of Geophysical Research*, 85, 3964-70, 1980.

[Hart and Miskin, 1945]: C. A. Hart and E. A. Miskin, "Developments in the method of determination of beach gradients by wave velocities," *Air survey research paper no. 15*, Directorate of Military Survey, UK War Office, 1945.

[Hedges, 1976]: T. S. Hedges, "An empirical modification to linear wave theory," *Proceedings of the Institution of Civil Engineers*, 61, 575-79, 1976.

[Hessner et al., 1999]: K. Hessner, K. Reichert, and W. Rosenthal, "Mapping of sea bottom topography in shallow seas by using a nautical radar," *Proceedings of the 2nd Symposium on Operationalization of Remote Sensing*, ITC, Enschede, Netherlands, 16-20 Aug. 1999.

[Hessner and Bell, 2009]: K. Hessner and P. S. Bell, "High Resolution Current & Bathymetry Determined by Nautical X-Band Radar in Shallow Waters," Unpublished, ca. 2009.

[Hoogeboom 1986]: P. Hoogeboom, J. C. M. Kleijweg, and D. van Halsema, "Seawave measurements using ship's radar," *Proceedings of the IGARSS'86*, 8-11 Sep. 1986.

[Kennedy and Kirby, 2000]: A. B. Kennedy, R. A. Dalrymple, and J. T. Kirby, "Determination of Inverse Depths Using Direct Boussinesq Modeling," *J. Waterway, Port, Coastal, And Ocean Engineering*, July/August 2000.

[Nieto-Borge and Soares, 2000]: J. C. Nieto-Borge and C. Guedes Soares, "Analysis of directional wavefields using X-band navigation radar," *Coastal Engineering* 40, 375-91, 2000.

[Piotrowski et al., 2002]: C. C. Piotrowski, and J. P. Dugan, "Accuracy of Bathymetry and Current Retrievals From Airborne Optical Time-Series Imaging of Shoaling Waves," *IEEE Transactions on Geoscience and Remote Sensing*, 40, No. 12, December 2002.

[Senet et al., 2008]: C. M. Senet, J. Seemann, S. Flampouris, and F. Ziemer, "Determination of Bathymetric and Current Maps by the Method DiSC Based on the Analysis of Nautical X-Band Radar Image Sequences of the Sea Surface," *IEEE Transactions on Geoscience and Remote Sensing*, 46, 1-9, Aug. 2008.

[Smith, 1991]: M. J. Smith, E. M. Poulter, J. A. McGregor, and B. R. Stanton, "Microwave Radar Investigation of Coastal Ocean Wave Propagation," *Proceedings of the IGARSS'91*, 3-6 Jun., 1991.

[Stockdon and Holman, 2000]: H. F. Stockdon and R. A. Holman, "Estimation of wave phase speed and nearshore bathymetry from video imagery." *J. Geophysical Research* 105 (C9), 22015-33, 2000.

[Takewaka, 2000]: S. Takewaka, "Measurements of Surfzone Dynamics and Bottom Profiles with Moored Video System," PACON Conference, Hawaii, 2000.

[Tang et al., 2008]: Y. Tang, Y Hao, and Z. Lu, "Ocean Surface Currents Determination from X-Band Radar Image Sequences," *Proceedings of the 2008 International Work-* shop on *Education Technology and Training & 2008 International Workshop on Geoscience and Remote Sensing*, 1, 320-23, 2008.

[Trizna, 2001]: D. Trizna, "Errors in Bathymetric Retrievals Using Linear Dispersion in 3-D FFT Analysis of Marine Radar Ocean Wave Imagery," *IEEE Transactions on Geoscience and Remote Sensing*, 39, No. 11, November 2001.

[van Halsema and Kleyweg, 1986]: D. van Halsema, D. and J. C. M. Kleyweg, "The measurement of wavefields with a simple ship's radar," *Fysisch En Electronisch Laboratorium, TNO, Report FEL*, 20 Apr. 1986 (in Dutch).

[Wang, 2002]: D. W. Wang, J. M. Kaihatu, and P. A. Hwang, "On the analysis of dispersion relation of shoaling waves," *Proceedings of the 7th International Workshop on Wave Hindcasting and Forecasting*, Banff, Alberta, 353-60, October 2002.

[Weiss, 1997]: J. M. Weiss, "Three-Dimensional Linear Solution for Wave Propagation with Sloping Bottom," *IEEE Journal of Oceanic Engineering*, 22, 203-10, April 1997.

[Williams, 1946]: W. W. Williams, "The determination of gradients of enemy-held beaches," *Geographical Journal* 107, 76-93, 1946.

[Young et al., 1985]: I. R. Young, W. Rosenthal, and F. Ziemer, "A Three-Dimensional Analysis of Marine Radar Images for the Determination of Ocean Wave Directionality and Surface Currents," *J. Geophysical Research*, 90, 1049-59, 1985.

What is claimed is:

1. A method for determining depth and surface current in a body of water comprising
   obtaining a first plurality of overhead images of an area of said body of water wherein said first plurality of images has pixel intensity correlated with wave height;
   obtaining a second plurality of images by preprocessing said first plurality of images, as and if needed, such that all images of said second plurality of images are mapped onto a grid of fixed coordinates, and the pixel intensities have a near linear relationship to wave height;
   obtaining a two-dimensional Fourier transform of each of said second plurality of images;
   finding an extremum of an objective function, wherein said objective function is a function of $$\mathfrak{I}_2^{-1}[G(F_1, \Phi F_2)]$$

where
   $\mathfrak{I}_2^{-1}$ is the inverse two-dimensional Fourier transform operator,
   G is a mathematical function,
   $F_1$ is a first two-dimensional Fourier transform of a first image of said second plurality of images,
   $\Phi F_2$ is a second two-dimensional Fourier transform of a second image of said second plurality of images, said second two-dimensional Fourier transform propagated to the time of said first image,
   $\Phi$ is a gravity wave propagation function, $\Phi$ being a function of the depth and surface current (velocity) vector at each pixel location in said second plurality of images; and
   wherein the depth and/or surface current vector at each pixel location are varied as independent fitting parameters to find said extremum, and
   wherein said extremum is sharply peaked at a particular set of depth values and a particular set of surface current vector values; and
   displaying said particular set of depth and/or surface current vector values as numbers, as maps, or by other suitable data visualization means.

2. The method of claim 1, wherein said objective function is $$J(\vec{x}) = \sum_{m \in M} \sum_{n=1}^{N-m} \sum_{A(\vec{x})} \left| \mathfrak{I}_2^{-1} \left[ W(\vec{k}) \Xi(F_n, \Phi^{-m} F_{n+m}) \right] \right|^2,$$

where
$\Phi$ is the gravity wave propagation function, $$e^{\pm i \omega_0(\vec{k}, d, \vec{u}) \tau},$$

$\omega_0$ is the gravity wave dispersion frequency, which is a function of $\vec{k}$, d, and $\vec{u}$,
$\tau$ is time between images,
$\vec{k}$ is a wavenumber vector,
d is depth,
$\vec{u}$ is current vector,
$\Xi(F_n, \Phi^{-m}F_{n+m})$ is either
a difference of paired images, $F_n(\vec{k}) - \Phi^{-m}F_{n+m}(\vec{k})$ or
a complex conjugate product of paired images, $F_n(\vec{k})(\Phi^{-m}F_{n+m}(\vec{k}))^+$,
$F_n$ is the 2D Fourier transform of image n,
W is a wavenumber weighting function used to select Fourier components containing more signal and less noise,
$\mathfrak{I}_2^{-1}$ is the inverse 2D Fourier transform operator,
$\vec{x}$ is a location on the Earth surface,
A is a sliding spatial window used to average out noise,
N is the total number of images (at least 2),
m is a positive integer defining the interval between paired images,
M is a set of values of m.

3. The method of claim 2, wherein $$\omega_0(\vec{k}|d, \vec{u}) = \sqrt{g|k|\tanh(|k|d)} - \vec{k} \cdot \vec{u},$$

where
g is Earth gravitational acceleration (~9.81 m/s$^2$).

4. The method of claim 2, wherein $$\omega_0(\vec{k}|d, \vec{u}) = \sqrt{g|k|\tanh(|k|d(1+\alpha H/d))} - \vec{k} \cdot \vec{u},$$

where
g is Earth gravitational acceleration (~9.81 m/s$^2$),
$\alpha$ is an empirically determined constant,
H is wave height.

5. The method of claim 2, wherein said extremum is a minimum, and $$\Xi = [(F_n(\vec{k}) - \Phi^{-m}F_{n+m}(\vec{k}))].$$

6. The method of claim 2, wherein said extremum is a maximum, and $$\Xi = [(F_n(\vec{k})(\Phi^{-m}F_{n+m}(\vec{k}))^*].$$

7. The method of claim 2, wherein the time between paired images, m$\tau$, is selected such that accurate wave displacement can be measured between said paired images, and such that the waves in said paired images are coherent with each other in accordance with the gravity wave dispersion formula.

8. The method of claim 1, further comprising
determining said extremum by varying depth and current over a set of possible values.

9. The method of claim 1, further comprising
estimating said particular set of surface current vector values by optical flow without regard to depth;
remapping said second plurality of images using rubber sheeting to remove current displacement;
determining said extremum by varying depth only.

10. The method of claim 1, wherein said preprocessing comprises image registration, ortho-rectification, camera distortion correction, pixel gain correction, interpolation for bad pixels, adjustment for image non-linearities, or combinations thereof.

11. The method of claim 1, wherein said first plurality of images is obtained from an airborne or space-based platform.

12. The method of claim 11, wherein said airborne or space-based platform comprises a helicopter, aircraft, aerostat, rocket, or orbiting satellite.

13. The method of claim 1, wherein said first plurality of images is obtained from a vantage point on or near the shore, on an ocean platform, or onboard an ocean-going vessel.

14. The method of claim 1, wherein said first plurality of images is obtained by coherent (Doppler) or incoherent (power only) radar.

15. The method of claim 1, wherein said first plurality of images is obtained by LIDAR.

16. The method of claim 1, wherein said first plurality of images is obtained by optical imaging in the visible, infrared and/or ultraviolet.

17. The method of claim 16, wherein said first plurality of images is obtained using a multi-spectral camera.

18. A bathymetry system comprising
an imaging platform configured to obtain a first plurality of overhead images of an area of a body of water wherein said first plurality of images has pixel intensity correlated with wave height; and
an image processing system configured to process said first plurality of images and displaying results of said processing, and wherein said processing comprises
creating a second plurality of images by preprocessing said first plurality of images, as and if needed, such that all images of said second plurality of images are mapped onto a grid of fixed coordinates, and the pixel intensities have a near linear relationship to wave height;
obtaining a two-dimensional Fourier transform of each of said second plurality of images;
finding an extremum of an objective function,
wherein said objective function is a function of $$\Im_2^{-1}[G(F_1, \Phi F_2)]$$

where
$\Im_2^{-1}$ is the inverse two-dimensional Fourier transform operator,
G is a mathematical function,
$F_1$ is a first two-dimensional Fourier transform of a first image of said second plurality of images,
$\Phi F_2$ is a second two-dimensional Fourier transform of a second image of said second plurality of images, said second two-dimensional Fourier transform propagated to the time of said first image,
$\Phi$ is a gravity wave propagation function, $\Phi$ being a function of the depth and surface current (velocity) vector at each pixel location in said second plurality of images;
wherein the depth and/or surface current vector at each pixel location are varied as independent fitting parameters to find said extremum, and
wherein said extremum is sharply peaked at a particular set of depth and a particular set of surface current vector values; and
displaying said particular set of depth and/or surface current vector values as numbers, as maps, or by other suitable data visualization means.

19. The system of claim 18, wherein said particular set of depth values is used to monitor currents in shipping lanes, to detect rip tides, or to monitor changes in beach morphology.

20. The system of claim 18, wherein said particular set of depth values and surface current vector values is used to provide real time bathymetry and current data in waters on a ship's path.

* * * * *